US009344371B1

(12) United States Patent
Sanyal et al.

(10) Patent No.: US 9,344,371 B1
(45) Date of Patent: *May 17, 2016

(54) DYNAMIC THROTTLING SYSTEMS AND SERVICES

(71) Applicant: Amazon Technologies, Inc., Seattle, WA (US)

(72) Inventors: Soumya Sanyal, Seattle, WA (US); Ernest S. Powers, III, Seattle, WA (US); Mack Zhou, Seattle, WA (US); Matthew T. Tavis, Seattle, WA (US); Stephen A. Slotnick, Seattle, WA (US); John Wai Yam Hui, Seattle, WA (US); Charles Porter Schermerhorn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,090

(22) Filed: Oct. 13, 2014

Related U.S. Application Data

(63) Continuation of application No. 13/620,407, filed on Sep. 14, 2012, now Pat. No. 8,863,266, which is a continuation of application No. 12/164,709, filed on Jun. 30, 2008, now Pat. No. 8,281,382.

(51) Int. Cl.
*H04L 12/803* (2013.01)
*H04L 29/08* (2006.01)
*H04L 29/06* (2006.01)

(52) U.S. Cl.
CPC .............. *H04L 47/125* (2013.01); *H04L 63/10* (2013.01); *H04L 67/32* (2013.01)

(58) Field of Classification Search
None
See application file for complete search history.

(56) References Cited

U.S. PATENT DOCUMENTS 7,219,239 B1 * 5/2007 Njemanze ........... H04L 63/0218 726/21
7,957,871 B1 * 6/2011 Echeruo ............ G01C 21/3626 104/27
8,281,382 B1 10/2012 Sanyal et al.
8,863,266 B1 10/2014 Sanyal et al.
2003/0110394 A1 * 6/2003 Sharp ................. H04L 12/2602 726/23
2004/0250124 A1 * 12/2004 Chesla ................. G06F 21/552 726/13
2005/0071276 A1 * 3/2005 Bruchlos ............... G06Q 30/00 705/51
2005/0278259 A1 12/2005 Gunaseelan et al.

(Continued)

OTHER PUBLICATIONS

U.S. Appl. No. 12/164,709 , "Final Office Action", mailed Mar. 8, 2012, 11 pages.

(Continued)

*Primary Examiner* — Hadi Armouche
*Assistant Examiner* — Malcolm Cribbs
(74) *Attorney, Agent, or Firm* — Kilpatrick Townsend & Stockton LLP

(57) ABSTRACT

A lightweight throttling mechanism allows for dynamic control of access to resources in a distributed environment. Each request received by a server of a server group is parsed to determine tokens in the request, which are compared with designated rules to determine whether to process or reject the request based on usage data associated with an aspect of the request, the token values, and the rule(s) specified for the request. The receiving of each request can be broadcast to throttling components for each server such that the global state of the system is known to each server. The system then can monitor usage and dynamically throttle requests based on real time data in a distributed environment.

17 Claims, 6 Drawing Sheets

100
102
104
Network
Web Server
Application Server
106
108
Production
Testing
User Information
110
112
114
116
118
Development Server
120

(56) References Cited

U.S. PATENT DOCUMENTS

| | | | | |
|---|---|---|---|---|
| 2006/0137003 | A1* | 6/2006 | Glania | H04L 63/0218 726/11 |
| 2006/0179472 | A1 | 8/2006 | Chang et al. | |
| 2006/0236401 | A1 | 10/2006 | Fosdick | |
| 2007/0078983 | A1 | 4/2007 | Modrall | |
| 2007/0214151 | A1* | 9/2007 | Thomas | H04L 63/14 |
| 2008/0083040 | A1* | 4/2008 | Dani | H04L 63/0807 726/28 |
| 2008/0215748 | A1 | 9/2008 | Kagan et al. | |
| 2009/0129400 | A1* | 5/2009 | Dibiaso | H04L 63/1416 370/412 |
| 2009/0288169 | A1* | 11/2009 | Petta | G06F 17/30864 726/26 |

OTHER PUBLICATIONS

U.S. Appl. No. 12/164,709 , "Non-Final Office Action", mailed May 6, 2011, 11 pages.

U.S. Appl. No. 12/164,709 , "Non-Final Office Action", mailed Sep. 21, 2011, 11 pages.

U.S. Appl. No. 12/164,709 , "Notice of Allowance", mailed Jun. 21, 2012, 8 pages.

U.S. Appl. No. 13/620,407 , "Final Office Action", mailed Nov. 1, 2013, 15 pages.

U.S. Appl. No. 13/620,407 , "Non-Final Office Action", mailed May 21, 2013, 12 pages.

U.S. Appl. No. 13/620,407 , "Notice of Allowance", mailed Jun. 13, 2014, 8 pages.

* cited by examiner

600

DYNAMIC THROTTLING SYSTEMS AND SERVICES

This application is a continuation of parent U.S. application Ser. No. 13/620,407, filed on Sep. 14, 2012, titled "DYNAMIC THROTTLING SYSTEMS AND SERVICES," which is a continuation of U.S. application Ser. No. 12/164,709, filed on Jun. 30, 2008, and issued as U.S. Pat. No. 8,281,382 on Oct. 2, 2012, titled "DYNAMIC THROTTLING SYSTEMS AND SERVICES," the contents of each are hereby incorporated in their entirety by reference.

BACKGROUND

In networks and other electronic environments, it is common for multiple users to send requests to a host, service, server, etc. As the number of users and requests increases, the number of resources needed to handle those requests increases as well. As the cost of purchasing and maintaining these resources can limit the amount of resources made available, there generally is a maximum number of requests that can be handled at any one time. If more requests are received, the quality of service can decrease significantly, as the response time might increase dramatically, requests might time out, or the system might crash or experience other problems.

One solution to this problem is to control the number of requests from any given requestor over a given timeframe. This is known as throttling. For example, a Web service might be configured to only allow up to one request per second from any given requestor. While such an approach is effective in some situations, it can be too limiting for other situations. For example, such an approach works well in an environment with a single host. If the environment utilizes several hosts, each of which can receive requests from a requestor, there is no easy way for each host to know exactly how many requests are being received from a requestor at the other hosts.

Further, there is no way to quickly, easily, or dynamically determine requestor usage and adjust the amount of throttling accordingly. In a system where throttling is controlled through configuration, it can be difficult and time consuming to monitor each requestor of a system and update configuration information accordingly. There typically is not information on a per-subscriber trending basis. If a requestor decides to abuse the system by flooding the system with requests, and that requestor is not currently throttled, the abuse might not be noticed until the next time for adjusting of the configuration data, which might be too late to avoid the brunt of the abuse. An administrator or other user would have to monitor usage and attempt to determine the source of the abuse, then manually blacklist that requestor.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to managing access to resources in an electronic environment. Systems and methods in accordance with various embodiments provide for dynamic throttling of requests, messages, or other such access to, or use of, resources that can be provided in a distributed environment. Approaches in accordance with various embodiments provide an overview of use or access across a network, cluster, or other group of servers and/or resources without having to store state information at each instance thereof. Such dynamic throttling management can be provided in various forms, such as a lightweight distributed component or standalone service.

Figure 1:
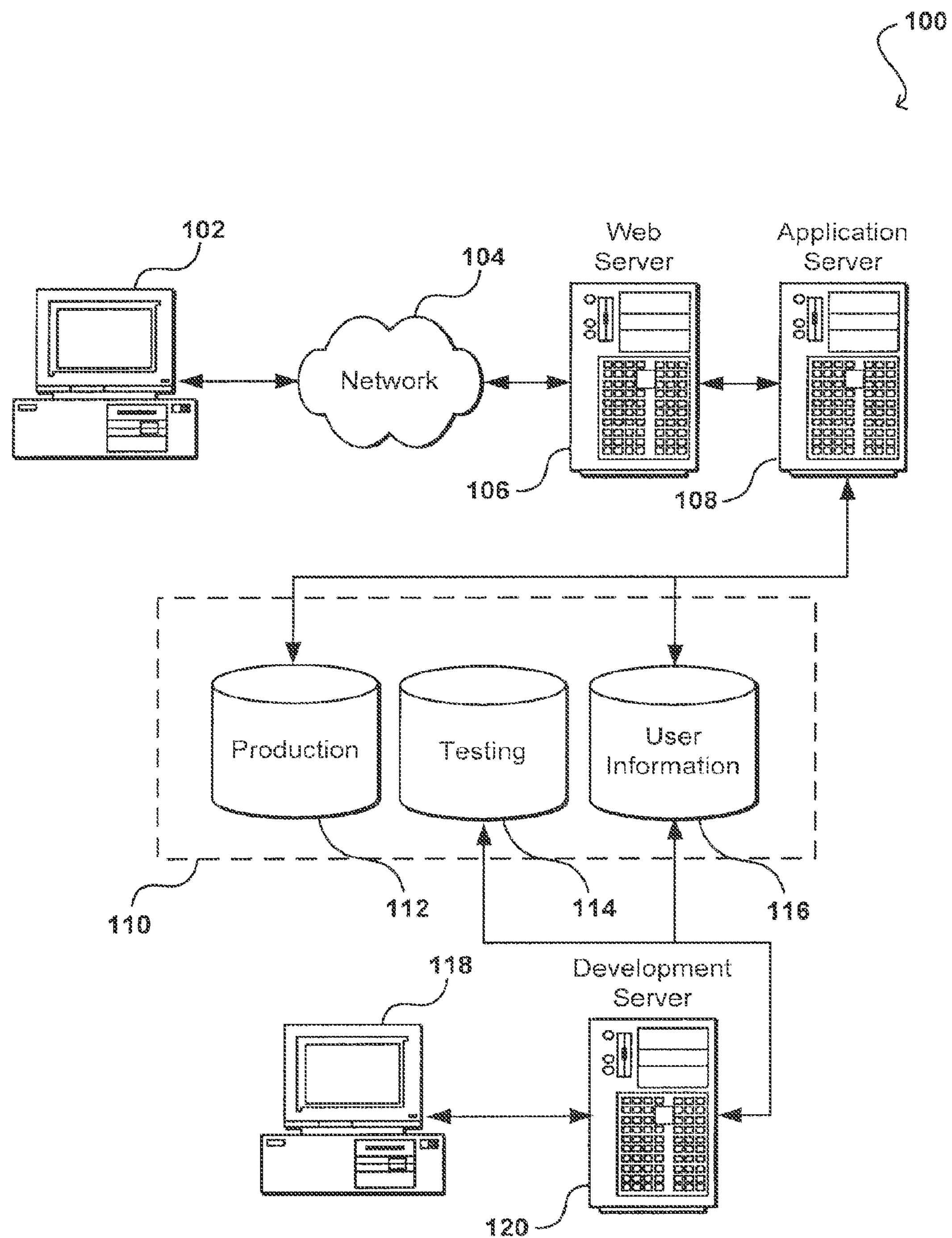
FIG. 1 illustrates an environment in which various embodiments can be implemented.

FIG. 1 illustrates an example of an electronic environment 100 for implementing aspects in accordance with various embodiments. As will be appreciated, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML or other such content for at least one Web page using hypertext transfer protocols. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

In the system illustrated in the example of FIG. 1, a user or requestor can send requests via the user device 102, or client, across the network 104 to access resources, such as information stored in the production data store 112. In some cases, there can be many users submitting requests through many user devices. The requests can be received in certain cases by any number of servers that can provide the data from any number of instances of the production data store 112. As discussed above, there can be a limit to the amount of requests that can be handled by these servers at any given time. In other instances, a system or service might choose to otherwise limit the amount of traffic or concurrent use of resources. In these and other such cases, the system or service might wish to limit the amount of requests that at least some users can submit in any particular period of time. For example, it might be desirable to limit a user to one request every five seconds. In some cases, multiple users will utilize an application. Web site, or other such mechanism for submitting the requests. This mechanism can be provided by a requestor or system subscriber, for example. In such a case, it may be desirable to limit the number of requests that can be received and processed for all users through that mechanism.

As discussed above, a limiting of access to resources becomes difficult in a distributed environment. A request from a user might be received by one of several appropriate servers or components. In an example where there may be dozens of servers receiving requests from tens of thousands of users, it is not practical to maintain state information for each of these requests at each of these servers. It then becomes difficult to limit a user to a number of requests, as one server might be unaware of the number of requests sent to other servers. Further, there is no way to quickly adjust the amount of requests or access for a user based on factors such as network use, changes in requestor use, etc. If a user is not limited but begins exceeding reasonable or agreed-upon use at a certain point in time, there is no way for the system to easily detect this change and begin to quickly limit the user to prevent potential problems resulting from such use.

Systems and methods in accordance with various embodiments address at least some of these and other aspects of managing access to resources in an electronic environment by providing a dynamic throttling mechanism. In one embodiment, a lightweight throttling component is used to receive or intercept requests for access and determine whether or not to provide such access using a global overview of usage data. In another embodiment, a throttling service, such as a throttling Web service, can be provided that sits "on top of" another service or application, for example, and controls access thereto. That is, the throttling service may be functionally placed between a requester and the other service or application. Other such throttling components and mechanisms can be used as well as would be understood to one of ordinary skill in the art in light of the teachings and suggestions contained herein. Further, although the examples are described with respect to users or requestors requesting access, it should be understood that the requests can be received from any appropriate person, application, component, service, or other such source in a manual or automatic process, or combination thereof.

In one example, a user submits a request for information from a Web browser across the Internet to a Web service. The request can be in any appropriate format, such as a standard hypertext transfer protocol (HTTP) request. The request will be received by a Web server, and can be directed to a throttling component or service. The throttling component can parse and/or determine information from the request that can be used to determine whether or not to process the request, such as whether the source of the request is authorized, how many requests have been sent for a given session, an Internet protocol (IP) address of the request, etc. The throttling component can compare this information with information such as configuration and traffic data to decide, on a request-by-request basis, whether to allow access. If the data for the request results in a determination that the request should be processed, the request, or a portion thereof, can be passed to the appropriate Web service and processed, and the data can be returned to the user in an appropriate format, such as an extensible markup language (XML) document. If a decision is made not to process the request, a response can be returned to the user indicating that the request was denied. In some embodiments this can take the form of a "service unavailable" or other such message. In other embodiments, a response can be sent that includes information indicating to the user that the request was denied for a particular reason, such as exceeding an agreed-upon amount of traffic. The actual throttling in one embodiment is performed by a daemon for each server in the group of managed servers capable of serving the request. In other embodiments, there may be a distributed set of daemons and/or similar components across the electronic network. As known in the art, a daemon is typically a computer program, module, or process that runs in the background on each server, rather than under the direct control of a user. In other embodiments, the throttling can be performed by an appropriate service, process, etc. After a decision is made, information for the request can be propogated to other servers in the managed group, such that each server knows the global state of the system. Thus, a requestor can at any time send a request to one of the servers, and that server will be able to know when that requestor last made a request and/or other such information.

Figure 2:
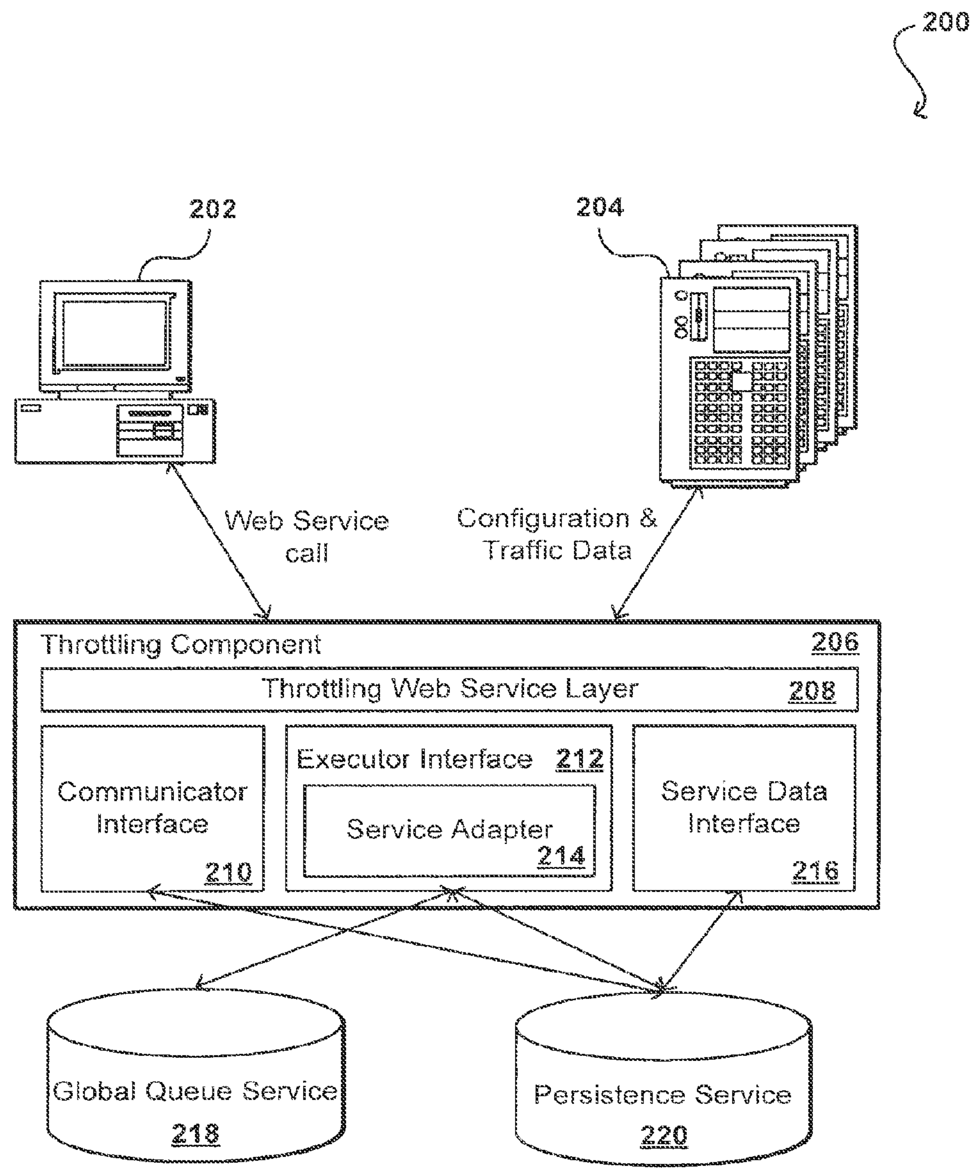
FIG. 2 illustrates a components of an approach for throttling requests that can be used in accordance with one embodiment.
Figure 3:
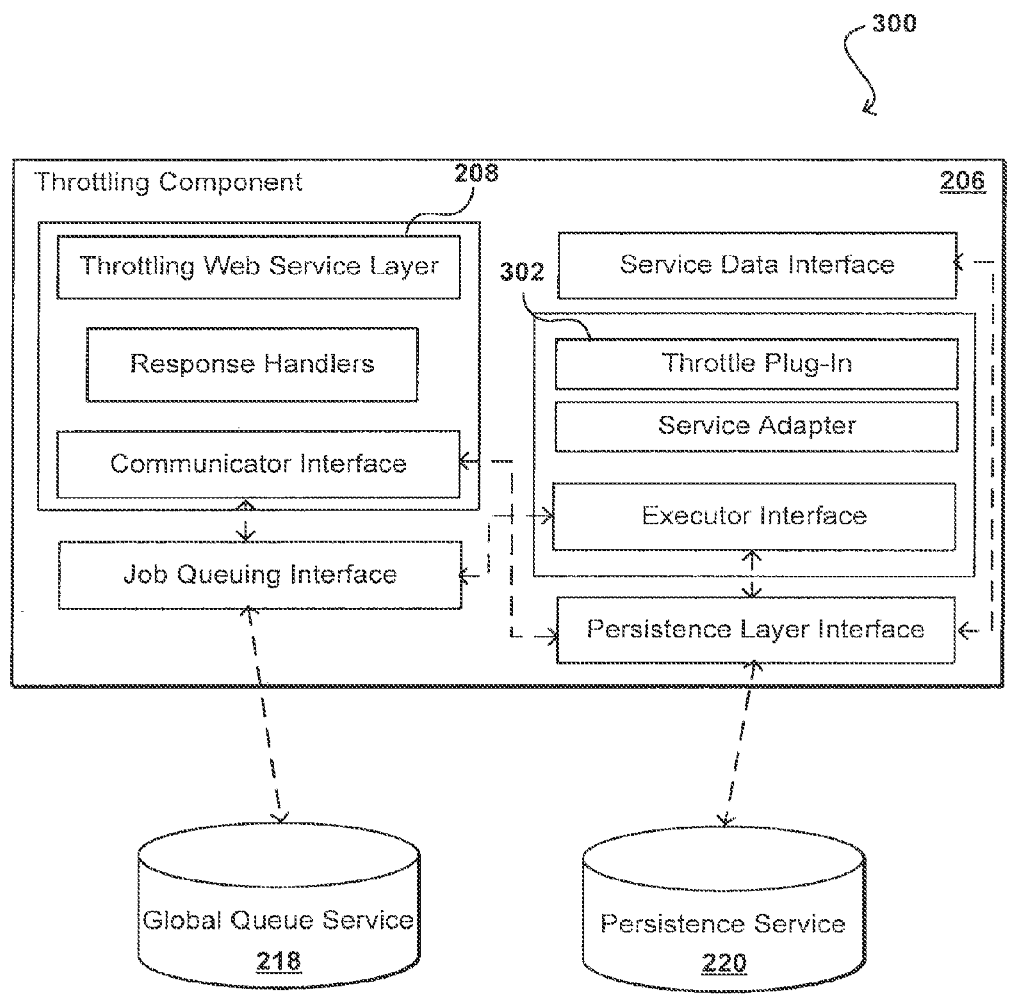
FIG. 3 illustrates a components of a throttling mechanism that can be used in accordance with one embodiment.

FIG. 2 illustrates components of one such system 200 for managing access to resources in accordance with one embodiment. It should be understood that other components may be used to implement the system as discussed elsewhere herein. In this example, at least one lightweight throttling component is provided for a group of servers 204 capable of receiving Web service requests from at least one client The component can be free of any hardware or tight data dependencies, and can be a single mechanism that is distributed across all the appropriate hosts in the system. The throttling component can be used to assimilate state information that is distributed globally across a number of servers into a single endpoint such that a global decision can be made as to whether a request should be processed. FIG. 3 shows another view 300 showing additional components that can be used with the throttling component 206 of FIG. 2.

In this example, the throttling component 206 comprises a throttling Web service layer 208 that sits on top of two separate services, here global queue service 218 and a persistence service 220. In a throttling example, a user, administrator, or other authorized user first sends or specifies a request such as an "AddRule," "EditRule." or "RemoveRule" request. In order for the system to know when to throttle a user or request, for example, at least one rule is first specified that provides the throttling component with instructions to be used for throttling. Each request can include pieces of information that can be parsed or extracted as tokens. For any particular service where requests are to be throttled, a parameter such as at least one "TokenType" can be utilized that specifies a type of information and/or parameter of an incoming request to be analyzed for throttling purposes. The token type can specify any of a number of dimensions of data for a request, such as an identifier or IP address used to generate the request, a session or user identifier, an associate identifier tag, etc. A communicator of the throttling component can parse that request and, where necessary, push and/or pull data from the request through a communicator interface 210 to the persistence service. In one embodiment, the relevant data can be found in any appropriate identifier in the request, such as may be found in a header or body of the request, etc.

The throttling component 206 thus parses the request and can validate the request using validation techniques known in the art. Data for the request can be stored, for example, to a persistence service 220. A persistence service is able to manage and guarantee data without the service or system having to maintain the data. Use of such a service also allows the throttling component to remain stateless and not hold any state or local data, and can instead simply hold the logic needed for throttling the requests. In addition to a persistence service, the throttling component can also take advantage of a job queue, which can also take the form of a global queue service 218. When data is stored in the persistence service, job data also can be stored to the global queue service. The throttling component can include an executor, acting as a processor, which through an executor interface 212, and in conjunction with a service adapter 214, is able to monitor the job queue for jobs to be processed. When there is a job in the queue to be processed at a particular time, the executor is able to call for the corresponding data from the persistence service 220 needed to process the job. In one embodiment the executor is an executor service that obtains a job ID from the global queue service without caring about what the job is or what the job does. The executor service can simply examine jobs to be executed at particular times and push those jobs into the job queue. For example, as discussed elsewhere herein, a rule might be added to take effect at a particular time in the future. Accordingly, when it is time to process the new rule a job ID for the rule can be added to the job queue. The data in one embodiment is pushed to a table that can be examined by a throttle plug-in 302, or other such component of the executor service that allows authorized servers, clients, or other components to pull and/or push configuration data. The throttling plug-in can be used, for example, to request any throttling data, etc. The executor can include logic to understand each of the relevant fields in the persistence service, the type of action, etc., and can write the appropriate data to a table for use with the throttle plug-in. The throttling component also includes a service data interface 216 that is able to obtain and track real time request information to enable real-time throttling.

As discussed, the throttling component relies in part upon rules to be used for throttling requests. There can be any of a number of types of requests sent to add, remove, or modify rules. In one embodiment of a throttling Web service there are at least four types of requests that can be issued: AddRule, EditRule, GetRule, and RemoveRule. The Web service can accept the requests in any appropriate form, such as HTTP queries.

For an AddRule request, the action to be specified is an AddRule action, which is followed by a list of required attributes and optional attributes such as ServiceName, RuleType, and EffectiveDate. Each attribute name and its value are separated by an '&' or other appropriate character. The following is an example of what one can type into a browser to issue an add rule request through an HTTP query:

(domain and port)?Action=AddRule&ServiceName=ok&RuleType=whitelist&TokenType=IP&TokenValue=1.1.1.5

In this example, the effective date optional attribute is missing. Therefore, the command assumes the date of issuing as the effective date for this AddRule request. The following example illustrates a request with an explicit Effective Date:

(domain and port)?Action=AddRule&ServiceName=ok&RuleType=whitelist&TokenType=IP&Token Value=1.1.1.5&EffectiveDate=2008-08-15

In this example, the effective date is specified in the format of YYYY-MM-DD in the query string, a that format complies with ISO 8601 date standards. At this effective date, the job will be added to the queue for the rule to be applied.

For an EditRule request, the action to be specified is an EditRule action, which is similar to AddRule request, where only a Boolean value will be returned to indicate whether the operation is successful. In an example using only one executor instance on one machine, the changes in the persistent can take place in about 1-10 seconds by specifying the following, for example:

(domain and port)?Action=EditRule&ServiceName=Hello&RuleId=100

RuleID and ServiceName are specified in this case, while attributes that need to be modified can be appended after the RuleID and Service name with a '&' or other appropriate character.

For a RemoveRule request, the corresponding RemoveRule action may only utilize attributes such as RuleID and ServiceName. Any other attributes to this request in at least one embodiment can be ignored:

(domain and port)?Action=RemoveRule&RuleID=100&ServiceName=Hello

For a GetRule request, a GetRule action can be used to obtain both requests in the persistence service and requests that are to be processed in the future in the persistence service. Both ServiceName and RuleType are be provided at a minimum in at least one embodiment:

(domain and port)?Action=GetRules&ServiceName=Hello&RuleType=NORMAL

However, other attributes can be added to further filter down the results.

(domain and port)?Action=GetRules&ServiceName=Hello&RuleType=NORMAL&Rate.MinRate=10&Rate.MaxRate=15

In the example above, only requests with rates between 10 and 15 (i.e., requests per second) are displayed. Note that the dot notation is used to specify a reference-type in a Web service definition language (WSDL). Similarly, the results can be filtered using date range as well:

(domain and port)?Action=GetRules&ServiceName=Hello&RuleType=NORMAL &LastChangedDate Range.StartingDate=2008-08-10 &LastChangedDate Range.EndingDate=2008-09-10

If only one date range is provided, then all requests with dates after or before that date are returned.

Figure 4:
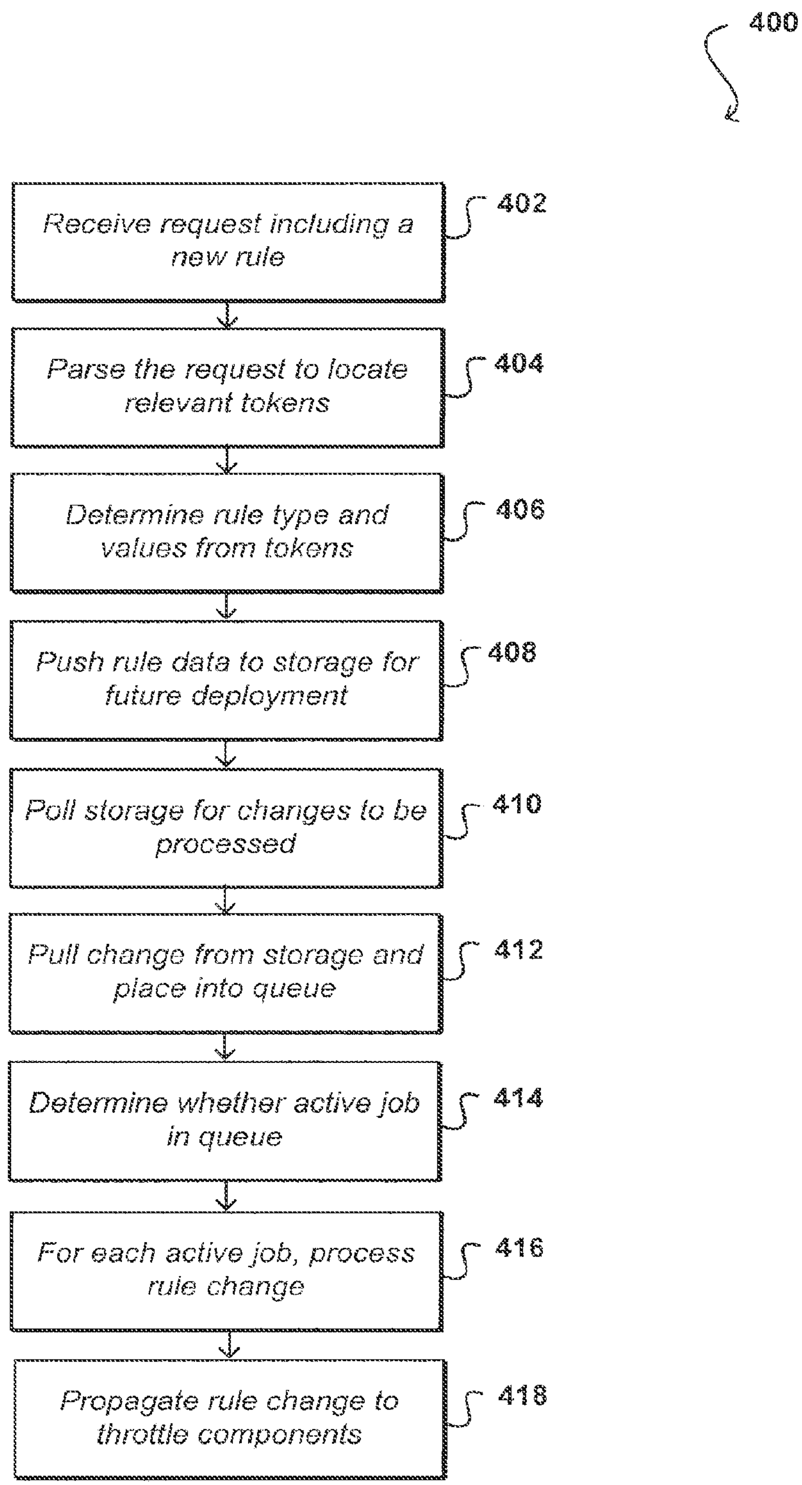
FIG. 4 illustrates steps of a process for specifying throttling rules that can be used in accordance with one embodiment.

FIG. 4 illustrates steps of a process 400 for adding a rule to be used for throttling requests in accordance with one embodiment. In this example, an authorized user submits a request to add a rule for throttling with an effective date (which could be any time in the future), which is received by a throttling mechanism 402. The throttling mechanism parses the request 404 and determines the type of rule and any rule values associated with the request 406. The rule value is then pushed to a persistence service for future deployment 408. The persistence service is polled asynchronously to determine if any rule changes are to be processed 410. If a rule change is to be processed, the data for the change is pulled from the persistence service and placed into a queue 412. In some embodiments, the data (or at least a job ID for the data) is placed into either a long term queue or a short term queue. A long term queue can be used for any job to be processed after a certain amount of time, according to the "effective date" that can also specify a time, such as in one hour or more from the time the job is placed into the queue. The short term queue can be used for jobs that are to be processed more quickly. While "queues" typically will be used in many embodiments, many other such components can be used as well to perform similar tasks, such as providing a central location from which to obtain information and allowing for load distribution across the electronic environment. A queue (or similar component) is polled to determine whether there are any active jobs to be executed 414. If a job is found, the type of request is parsed (i.e., by the executor) and the rule change is processed 416. In one embodiment, the parsed data is passed to the throttle plug-in, which massages the data from the request and pushes and/or pulls the data to a cache for each throttle daemon 418. Once the new rule data is detected in the respective cache, each throttle daemon adds the rule data to its in-memory data structure. At this point, the rule change is in effect for each respective host.

In some embodiments, any new rule is first applied on at least one of a set of throttling configuration components. The set of throttling configuration components is able to share the rule with the other configuration components in the set. Each throttling component across the environment then is able to retrieve the rule by querying one of the set of throttling configuration components.

As can be seen, one advantage to such an approach is that, using an AddRule or similar request, a future and/or effective date and/or time can be specified with new or altered rules. For example, it might be desirable to prevent access by a requestor after a certain point in time, such as when a subscription runs out. Such an approach allows a user to add a rule to shut down the requestor access at the end of the subscription at any appropriate time, such as when the user is first approved for access with a subscription. By entering the rule ahead of time, the back-end services can process the data and make the rule effective at the appropriate time without any manual intervention. In one embodiment where a version of a service is to cease serving data at a certain point in time, a rule can be set up to effectively blacklist all users, or deny access or throttle each user request such that no request is processed or served after that point. A rule also can be set up to whitelist all requestors at a certain time, wherein no throttling will occur.

As should be apparent in light of the teachings and suggestions contained herein, other such rules can be utilized as well for various purposes. For example, a "Normal" rule can be used to apply default values to new requestors, such as up to five requests per second. If the requestor is a good customer, upgrades a subscription, or otherwise earns more access, then an "edit" or similar rule can be applied to change the throttling rate for that requestor, such as to ten requests per second. If the requestor subsequently loses that privilege, a "Remove" rule can be used to remove the new rule for the requestor and set the requestor back to the default rate.

Figure 5:
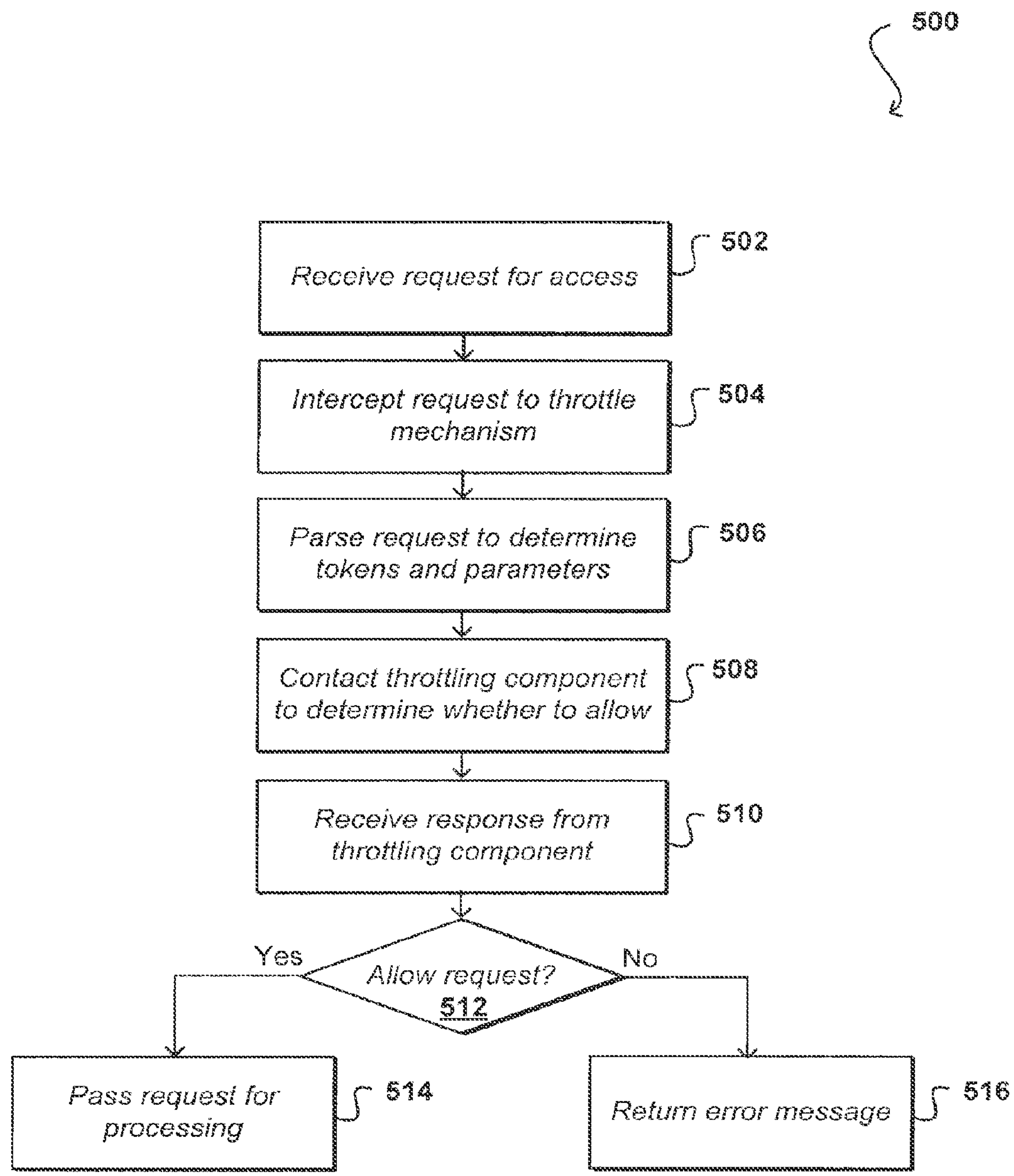
FIG. 5 illustrates steps of a process for throttling requests that can be used in accordance with one embodiment.

Once the appropriate rule is processed and applied, a user can be granted access to the system up to the amount of requests per unit time, for example, specified by the rule. This value can be stored in any appropriate location, such as in cache, local memory, or a data store for each server serving content. FIG. 5 shows an example of a process 500 by which a decision is made whether or not to throttle a requestor based on the applied rule. In this example, a request is received from a requestor of a Web service for access to, for example, catalog data 502. The request can correspond to a particular service name that is known across the domain. An interceptor in the Web server receiving the request intercepts the request 504 and parses the request to determine the appropriate tokens and/or parameters for the respective service 506. The interceptor then contacts a throttling daemon (or other such process or component) with the determined tokens and/or parameters to determine whether to allow the request to be processed or to deny (throttle) the request 508. The throttling daemon analyzes the tokens/parameters, the usage data, and the appropriate throttling rule(s) and returns a response as to whether to throttle the request 510. If the request is allowed 512, then the request is passed to the appropriate Web service for processing 514. If the request is not allowed, the interceptor returns an error message 516, such as a service not available message. For example, if a requestor is limited to six requests per second according to the set rule, and eight requests from that requestor are received in a second, then two of those requests should result in a "service not available" or similar message, while the allowed six requests will receive data. It should be understood, however, that in many embodiments there will be some lag or delay in throttling across a distributed environment, and the throttling process itself typically will not be instantaneous and/or perfect. For example, if all eight requests are received substantially simultaneously to eight different components across the environment, the information may not be aggregated quickly enough to throttle any of those requests. Further, if this is the first time that a user exceeds the amount then it may take some time to apply a throttling rule, etc. Also, while specific messages can be sent in lieu of a "service not available" message, such an approach would not be as fast and, for various reasons it might not be desirable to let a person know that the person is being throttled. In cases such as where a user is violating a license agreement, however, it might be desirable to inform the requestor that the requestor is exceeding the license and prompt the requestor to upgrade to a greater license.

Regardless of whether the request is processed or denied, the receiving of the request can be stored locally by the throttling component. At an appropriate time, the data can be pulled or pushed to the other throttling daemons such that the global usage data is known to each instance of the throttling daemon across the server group. The broadcasting allows the state of the requestor to be reported in an aggregated fashion so that each server is aware of all other recent requests to all other servers in the group. The fact that a daemon receives a request can be recorded then sent out every few seconds (or as configured) to the other daemons. While such data could be broadcast or multicast in real time, such an approach could flood certain systems with messages and, thus, not provide a desired optimization in performance. In one embodiment, only a rate of requests per second is used, such that the daemons can be updated every second and no past history information is stored. Thus, even if a user is allowed a certain number of requests per day, this can be converted into a number of requests per second (or other interval) and then used for throttling purposes.

Such an approach can be used with any service, site, component, module, application, process, etc., where rules can be defined to manage access to resources. The stateless component, service, layer, etc., simply accepts, processes, and pushes out data utilizing the appropriate caches, data stores, etc. In contrast to previous systems, the throttling components do not read configuration from a file and then require a restart, which loses the existing data over the last second, for example. The information can be pushed out to the other instances such that there is no need for restart and no loss of state. Since there is no restart period, there is no period of time where all requests can effectively be processed without limit. Further, the throttling is not done at a routing level but at a service level, which allows each request to be broken down into multiple service parameters, such as by using information in request header itself. Different levels of service then can be provided to different requestors based on a number of different factors. Further, the definitions in the rules can apply to these various parameters such that it would be tough for a user to flood the system by getting around the limits on access. In some embodiments this determination is done as what is currently known in the industry as "layer 7." an application layer in the network protocol stack, wherein more information is available than is available at the routing level, which could be limited to information such as IP address, which can be spoofed, etc. The components at the routing level cannot parse and process the tokens as discussed herein.

Figure 6:
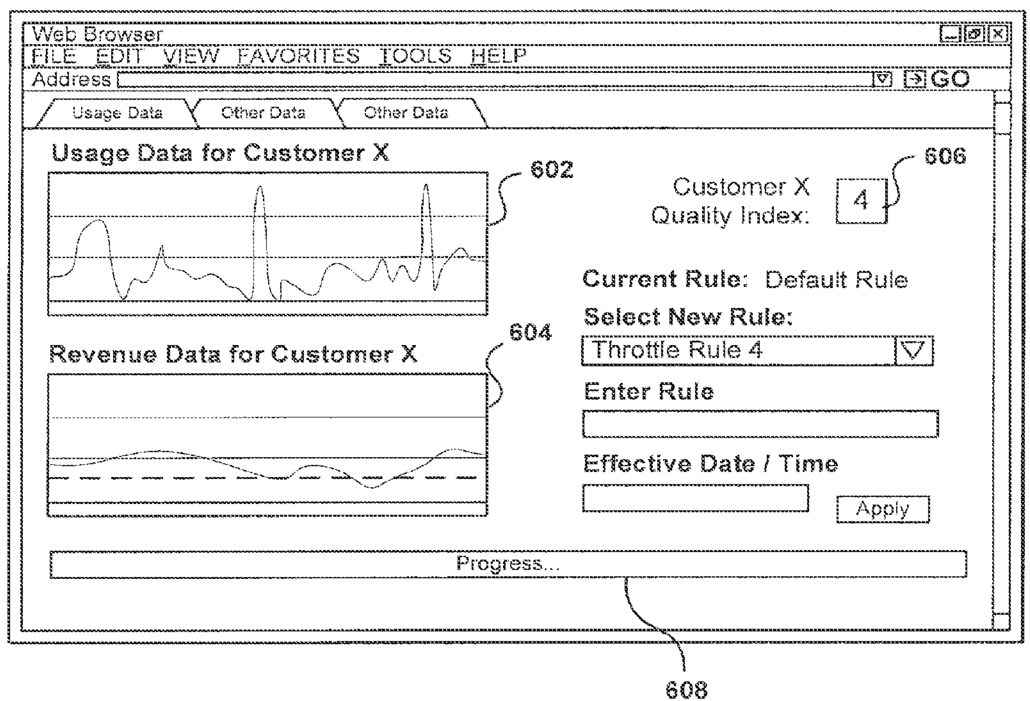
FIG. 6 illustrates an interface that can be used in accordance with one embodiment.

FIG. 6 illustrates an example of a user interface page 600 that can be used in accordance with one embodiment to monitor and/or manage user access. In this example the page is a Web page viewable through a browser or similar application, but it should be understood that the page can be a page of a standalone application, etc. Once a rule is applied for a requestor, for example, a user might want to view the usage of the requestor and determine whether the rule is adequate and/or working properly. In other embodiments, it might be desirable to monitor usage of requestors who are not being throttled, in order to determine which requestors should be throttled and at what time. For example, a data store can capture tokens or other such information that can be monitored or tracked over time, such as by using a usage 602 and/or revenue 604 graph as illustrated in the figure. While rules can automatically determine when to throttle a requestor, a user might wish to view the history for a requestor to determine when to apply a new rule, etc. A requestor might generate a large number of requests, but if the corresponding revenue is above a certain level, the user might decide not to apply a rule. In some instances, a quality index 606 or similar requestor rating can be determined and/or used to determine which rule to apply for throttling purposes. A user of this interface can apply a rule to a user by selecting a rule, typing in a rule request with desired parameters, etc. A user also can select an effective date for the rule change as desired. A progress bar 608 or other indicator can be used to show the progress of the application of the rule, such as how many of the hosts have received and applied the rule. As the number of hosts applying the rule increases, the amount by which a user exceeds a desired amount should decrease, where appropriate.

In one embodiment, a user is notified when a requestor exceeds a certain amount of traffic, or meets some other criterion. The user can pull up a usage data page for that requestor, and determine whether the requestor is doing something out of the ordinary, using substantially real-time data. The user also can view throttling data to see how often that user is throttled due to exceeding the appropriate number of requests, etc. A user thus can have full control over access to system resources.

Such an approach thus not only provides for automatically throttling based on detected conditions, but also provides a manual tool for controlling the throttling. Such a system can be used for purposes such as automatically detecting fraudulent activity, for example, in addition to managing user access to resources. Further, since usage and other data can be compared, an amount of access can be tied to revenue or other aspects, such as by throttling low-performing associates to successively lower access rates, until the requestor either performs for the set rate or is eventually blacklisted. Such an approach also can allow users to specify how much access they want, so that they can be controlled and billed accordingly. Such an approach thus can help provide for tiered access, which can be particularly attractive if the throttling is provided as a service, as a requestor can subscribe at a certain quality level.

As discussed above, the various embodiments can be implemented in a wide variety of operating and/or electronic environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsofts®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining access to a resource in an electronic environment, comprising:

under the control of one or more computer systems configured with executable instructions, receiving a client request for access to a resource;

parsing the client request to determine a token associated with the request, the token being associated with at least a parameter of the request;

tracking a frequency of requests associated with the token over time; and determining whether to add a client associated with the token to a collection as a candidate for throttling based at least in part on the frequency of requests associated with the token, wherein determining whether to add the client to the collection as a candidate for throttling further comprises:

providing local request data to one or more throttling components distributed across a server group;

receiving one or more instances of network request data from the one or more throttling components distributed across the server group; and generating global request data from the local request data and the one or more instances of network request data.

2. The computer-implemented method of claim 1, wherein determining whether to add the client to the collection as a candidate for throttling further comprises:

determining an aggregate frequency of requests associated with the token, the aggregate frequency corresponding to one or more related requests by a plurality of servers being operable to provide access to a resource in response to the related requests;

requesting an approval to throttle the client; and applying a throttling rule to the client based at least in part on the approval to throttle the client.

3. The computer-implemented method of claim 2, wherein:

the approval to throttle the client is based at least in part on a license associated with the client; and determining whether to list a client further comprises:

determining whether the client is violating one or more terms of a license; and when the client is violating the one or more terms of the license, causing a notification related to the violation.

4. The computer-implemented method of claim 1, wherein the local request data comprises a rate of requests per a period of time.

5. The computer-implemented method of claim 1, wherein the method further comprises:

applying a throttling rule to the client; and determining an effectiveness of the throttling rule based at least in part on whether the client is listed as a candidate for throttling.

6. The computer-implemented method of claim 1, wherein the method further comprises providing a recommended throttling rule to apply to the client.

7. A non-transitory computer-readable medium storing computer-executable instructions that direct one or more computer systems to collectively, at least:

capture an aggregate frequency of requests associated with a token, the aggregate frequency of requests corresponding to one or more related requests by a plurality of servers being operable to provide access to a resource in response to the related requests;

track the aggregate frequency of requests associated with the token over time; and determine whether to add a client associated with one or more of the requests to a collection as a candidate for throttling based at least in part on the aggregate frequency of requests associated with the token, wherein capturing the aggregate frequency of requests associated with the token further comprises:

transmitting local request data to one or more of a plurality of servers being operable to provide access to a resource in response to requests;

receiving request data from the one or more of a plurality of servers; and consolidating the local and received request data to form global request data.

8. The non-transitory computer-readable medium of claim 7, wherein determining access to a resource further comprises causing a notification related to requesting an approval to throttle the client.

9. The non-transitory computer-readable medium of claim 7, wherein determining access to a resource further comprises, when the client is determined to be a candidate for throttling, applying a throttling rule to the client and causing a notification related to an approval to throttle the client.

10. The non-transitory computer-readable medium of claim 7, wherein determining whether to add a client to a collection as a candidate for throttling further comprises converting a throttling rule based in part on a first measure of time to a throttling rule based on a second measure of time.

11. The non-transitory computer-readable medium of claim 7, wherein the global request data comprises at least one request frequency and at least one corresponding requestor identifier and individual request frequencies correspond to individual requestor identifiers.

12. The non-transitory computer-readable medium of claim 11, wherein determining whether to add a client to a collection as a candidate for throttling further comprises applying a throttling rule to the client based at least in part on the global request data associated with the client.

13. The non-transitory computer-readable medium of claim 12, wherein determining whether to list a client as a candidate for throttling further comprises notifying a user when a requestor meets a review criterion.

14. A computer system for determining access in an electronic environment, comprising:

one or more computer resources having one or more processors and memory including executable instructions that, when executed by the one or more computer resources, cause the computer system to implement at least:

a resource for which a request for access is received;

an intercepting component configured at least to parse the request for access to the resource to determine a token associated with the request, the token identifying at least a parameter of the request; and a throttling component configured at least to analyze a frequency of requests associated with the token and determine whether to add a client associated with the token to a collection as a candidate for throttling based at least in part on the frequency of requests associated with the token, wherein the throttling component is further configured to at least:

communicate local data associated with a frequency of requests to one or more components in a network;

receive remote data associated with a frequency of requests from the one or more components; and aggregate frequency data based at least in part on the local data and the remote data.

15. The computer system of claim 14, wherein the throttling component is further configured to request an approval to throttle the client and to apply a throttling rule to the client based at least in part on the approval to throttle the client.

16. The computer system of claim 15, wherein the approval to throttle the client is based at least in part on a license associated with the client, the throttling component further configured to determine whether the client is violating one or more terms of the license, the one or more terms of the license including a threshold of a frequency of requests.

17. The computer system of claim 14, wherein the throttling component is further configured to perform the aggregate frequency data operation on a periodic basis.

* * * * *